(12) United States Patent
Kaneko et al.

(10) Patent No.: US 10,280,994 B2
(45) Date of Patent: May 7, 2019

(54) VEHICLE DISC BRAKE

(71) Applicant: NISSIN KOGYO CO., LTD., Ueda, Nagano (JP)

(72) Inventors: Shinobu Kaneko, Nagano (JP); Shinichi Kihara, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/541,871

(22) Filed: Nov. 14, 2014

(65) Prior Publication Data

US 2015/0136537 A1    May 21, 2015

(30) Foreign Application Priority Data

Nov. 18, 2013  (JP) ................................ 2013-237552

(51) Int. Cl.
*F16D 55/226*    (2006.01)
*F16D 65/00*    (2006.01)
(Continued)

(52) U.S. Cl.
CPC ........ *F16D 65/0068* (2013.01); *B60T 17/043* (2013.01); *B60T 17/046* (2013.01);
(Continued)

(58) Field of Classification Search
CPC ............... B60T 17/04; F16D 2065/789; F16D 2121/04; F16D 2250/0007;
(Continued)

(56) References Cited

U.S. PATENT DOCUMENTS 3,406,792 A * 10/1968 Kennel ............. F16D 55/22655
188/205 A
3,958,667 A * 5/1976 de Gennes .......... F16D 55/2262
188/243
(Continued)

FOREIGN PATENT DOCUMENTS

FR    2991427 A1 * 12/2013 ............ B60T 17/043
JP    58118441        7/1983
(Continued)

OTHER PUBLICATIONS

Japanese Office Action for Related Application No. JP2013-237552, dated Dec. 21, 2015, 6 pages.

*Primary Examiner* — Bradley T King
*Assistant Examiner* — Stephen M Bowes
(74) *Attorney, Agent, or Firm* — Andrew M. Calderon; Roberts Mlotkowski Safran Cole & Calderon, P.C.

(57) ABSTRACT

An embodiment discloses a vehicle disc brake including a caliper body, a banjo and a banjo bolt. An acting portion of the caliper body has a cylinder bore accommodating a piston. The caliper body is formed through a gravity casting method. A gate mark is formed on the bottom wall of the cylinder bore as a result of cutting the gate after the caliper body has been cast, and the gate mark includes a worked surface and a projecting surface. A union hole communicating with a hydraulic pressure chamber and a locking hole receiving the locking projection of a banjo are opened in the worked surface. And, an uneven portion is provided between the worked surface and the projecting surface.

20 Claims, 5 Drawing Sheets (51) Int. Cl.
 *B60T 17/04* (2006.01)
 *F16D 55/00* (2006.01)
 *F16D 121/04* (2012.01)

(52) U.S. Cl.
 CPC .... F16D 55/226 (2013.01); *F16D 2055/0016* (2013.01); *F16D 2121/04* (2013.01); *F16D 2200/003* (2013.01); *F16D 2250/0007* (2013.01)

(58) Field of Classification Search
 CPC ....... F16D 2250/0015; F16D 2250/003; F16D 2250/0076; F16D 2250/0084; F16D 55/226; F16D 65/0068; F16D 65/183; F16L 27/093; F16L 41/005; F16L 41/007
 USPC ........................................................ 188/72.4
 See application file for complete search history.

(56) References Cited

U.S. PATENT DOCUMENTS

| | | | | |
|---|---|---|---|---|
| 3,970,172 | A | * | 7/1976 | De Gennes ........... F16D 55/226 188/73.36 |
| 4,460,070 | A | * | 7/1984 | Meyer ................. F16D 55/2262 188/72.4 |
| 4,550,809 | A | * | 11/1985 | Kawaguchi ............... B62L 1/00 188/18 A |
| 4,626,006 | A | * | 12/1986 | Noguchi ................. B60T 17/04 285/143.1 |
| 5,228,725 | A | * | 7/1993 | Aoyagi ................... B60T 17/04 285/141.1 |
| 5,289,903 | A | * | 3/1994 | Nagai ................... F16D 55/226 188/250 E |
| 2010/0307874 | A1 | * | 12/2010 | Suzuki .................... F16D 55/22 188/72.4 |
| 2012/0103734 | A1 | * | 5/2012 | Suzuki ................ B23K 20/122 188/72.4 |

FOREIGN PATENT DOCUMENTS

| | | |
|---|---|---|
| JP | 2004278730 A | 10/2004 |
| JP | 2011-006033 | 1/2011 |
| JP | 2011-046247 | 3/2011 |
| JP | 2011-137483 | 7/2011 |

* cited by examiner

VEHICLE DISC BRAKE

CROSS-REFERENCE TO RELATED APPLICATION(S)

This application claims priority from Japanese Patent Application No. 2013-237552 filed on Nov. 18, 2013, the entire contents of which are incorporated herein by reference.

FIELD

An embodiment described herein generally relates to a vehicle disc brake that is used for various types of vehicles such as motor vehicles, motor cycles and more particularly to a vehicle disc brake that is fabricated by a gravity casting method.

BACKGROUND

For example, a caliper body in a disk brake may be fabricated by a gravity casting method in which with cast iron, aluminum or aluminum alloy used as a base material, molten metal of the base material is poured from a gate opened in a bottom wall of a cylinder bore so that the whole of a cavity is filled with the molten metal by means of gravity (for example, refer to JP-2004-278730-A). In the caliper body fabricated in that way, a rising portion is formed on the bottom wall of the cylinder bore as a gate mark as a result of cutting the gate. A union hole is opened in the rising portion, and this union hole communicates with a hydraulic pressure chamber that is defined between the cylinder bore and a piston. Plural projections are also formed on the rising portion, and the projections lock a banjo that connects the union hole and a hydraulic pressure piping.

In the above-mentioned caliper body, after the caliper body has been cast, the gate is cut, and the plural projections that lock the banjo need to be formed by cutting or the like. This increases the number of working man-hours, which increases, in turn, the production costs.

SUMMARY

One object of the invention is to provide a vehicle disc brake that can lock the banjo in an ensured fashion while reducing the number of working man-hours.

One aspect of the present invention provides, a vehicle disc brake, including: a caliper body including an acting portion having a cylinder bore into which a piston is inserted, and a union hole being formed in a bottom wall of the cylinder bore so as to communicate with a hydraulic pressure chamber defined between the cylinder bore and the piston, the caliper body having been formed through a gravity casting method in which a molten metal of a base material is poured from a gate provided in the bottom wall of the cylinder bore; and a banjo provided on a hydraulic pressure piping; and a banjo bolt which attaches the banjo on the union hole, wherein a locking projection is formed on the banjo so as to project towards the bottom wall of the cylinder bore, wherein a gate mark is formed on the bottom wall of the cylinder bore as a result of cutting the gate after the caliper body has been cast, wherein the gate mark includes a worked surface that is at right angles to an axis of the cylinder bore, and a projecting surface that projects further than the worked surface in a direction opposite to a bottom portion of the cylinder bore, wherein the union hole and a locking hole are opened in the worked surface, the locking hole being formed so as to receive the locking projection of the banjo to thereby lock the banjo, and wherein an uneven portion is provided between the worked surface and the projecting surface.

Based on the above-mentioned configuration, there may be further provided the vehicle disc brake, wherein the uneven portion is formed parallel to a center line that connects a center of the union hole and a center of the locking hole.

Based on the above-mentioned configuration, there may be further provided the vehicle disc brake, wherein the projecting surface is an external surface of the non-worked gate mark.

Based on the above-mentioned configuration, there may be further provided the vehicle disc brake, wherein the locking hole is formed at either of a rotating disc entrance side and a rotating disc exit side of the bottom wall of the cylinder bore, and the projecting surface is formed at the other of the rotating disc entrance side and the rotating disc exit side of the bottom wall of the cylinder bore, the rotating disc entrance side and the rotating disc exit side being defined based on a rotational direction of a disc rotor with respect to the caliper body in a state where a vehicle is traveling forwards.

Based on the above-mentioned configuration, there may be further provided the vehicle disc brake, wherein a base material of the caliper body is aluminum or aluminum alloy.

According to the vehicle disc brake of the invention, the union hole and the locking hole are opened in the worked surface provided at the gate mark, and the banjo is locked to be free from rotation by inserting the locking projection into the locking hole. Therefore, the banjo can be locked in an ensured fashion with a small number of working man-hours, thereby making it possible to realize a reduction in production cost. The projecting surface that projects further in the opposite direction to the bottom portion of the cylinder bore than the worked surface, and therefore, even though the caliper body happens to be placed on a floor or the like with the bottom wall of the cylinder bore oriented downwards, the projecting surface can prevent the abutment of the union hole and the locking hole with a surface of the floor, thereby making it possible to protect the union hole and the locking hole.

The uneven portion that is formed between the worked surface and the projecting surface is formed parallel to the center line that connects the center of the union hole and the center of the locking hole, and therefore, the uneven portion constitutes an indicator for a direction in which the banjo is assembled in the union hole, whereby the banjo can be assembled properly.

The projecting surface is made up of the external surface of the non-worked gate mark, whereby the range of a surface area to be worked can be reduced, thereby making it possible to realize a reduction in production cost. The locking hole is formed at either of the rotating disc entrance side and the rotating disc exit side of the bottom wall of the cylinder bore when the vehicle is traveling forwards and the projecting surface is formed at the other of the rotating disc entrance side and the rotating disc exit side of the bottom wall of the cylinder bore when the vehicle is traveling forwards. This can not only ensure the space where to form the locking hole in the bottom wall of the cylinder bore properly but also dispose properly the locking hole, the union hole and the projecting surface in a well balanced fashion. Aluminum or an aluminum alloy is used as the base material of the caliper body, whereby not only can the banjo be properly assembled to the aluminum caliper body, but also a reduction in production cost can be realized.

DETAILED DESCRIPTION

FIGS. 1 to 5 show a vehicle disc brake according to an embodiment. An arrow A denotes a rotating direction of a disc rotor that rotates together with a wheel when the vehicle is traveling forwards. When referred to in the following description, a rotating disc entrance side and a rotating disc exit side mean accordingly when the vehicle is traveling forwards.

Figure 1:
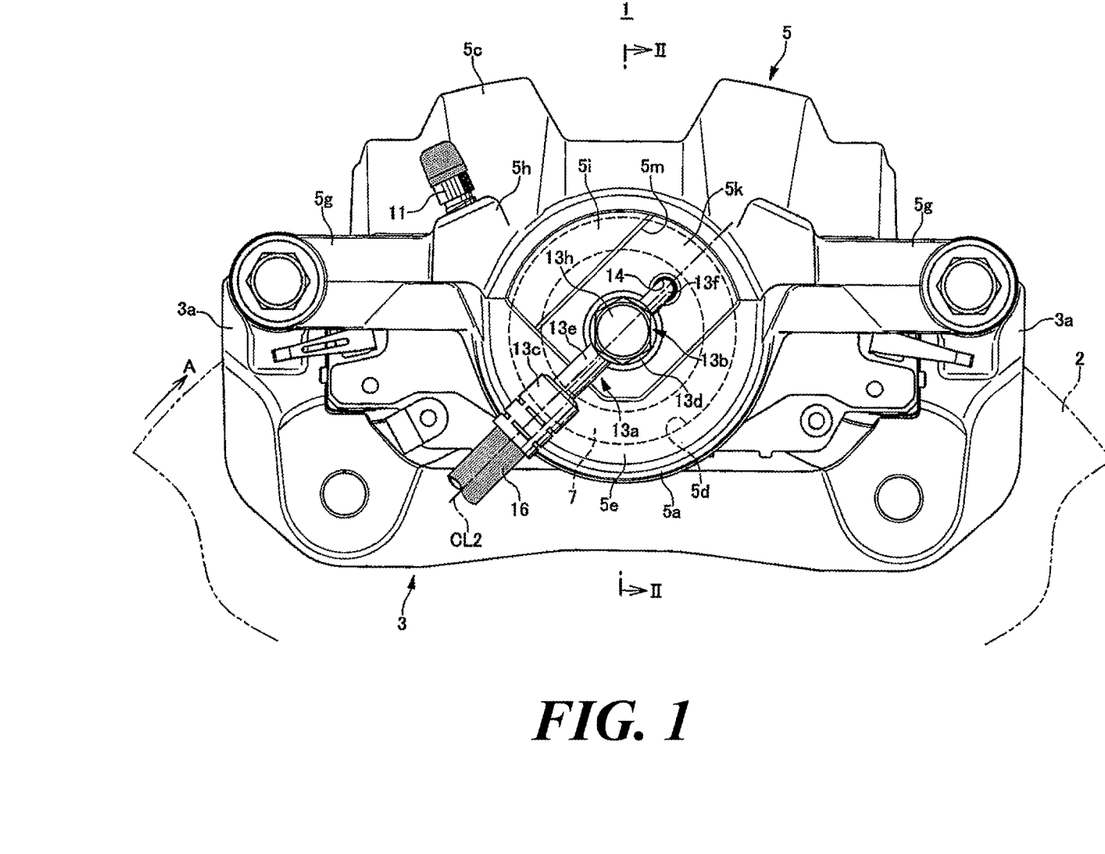
FIG. 1 is a front view of a vehicle disc brake according to an embodiment.
Figure 2:
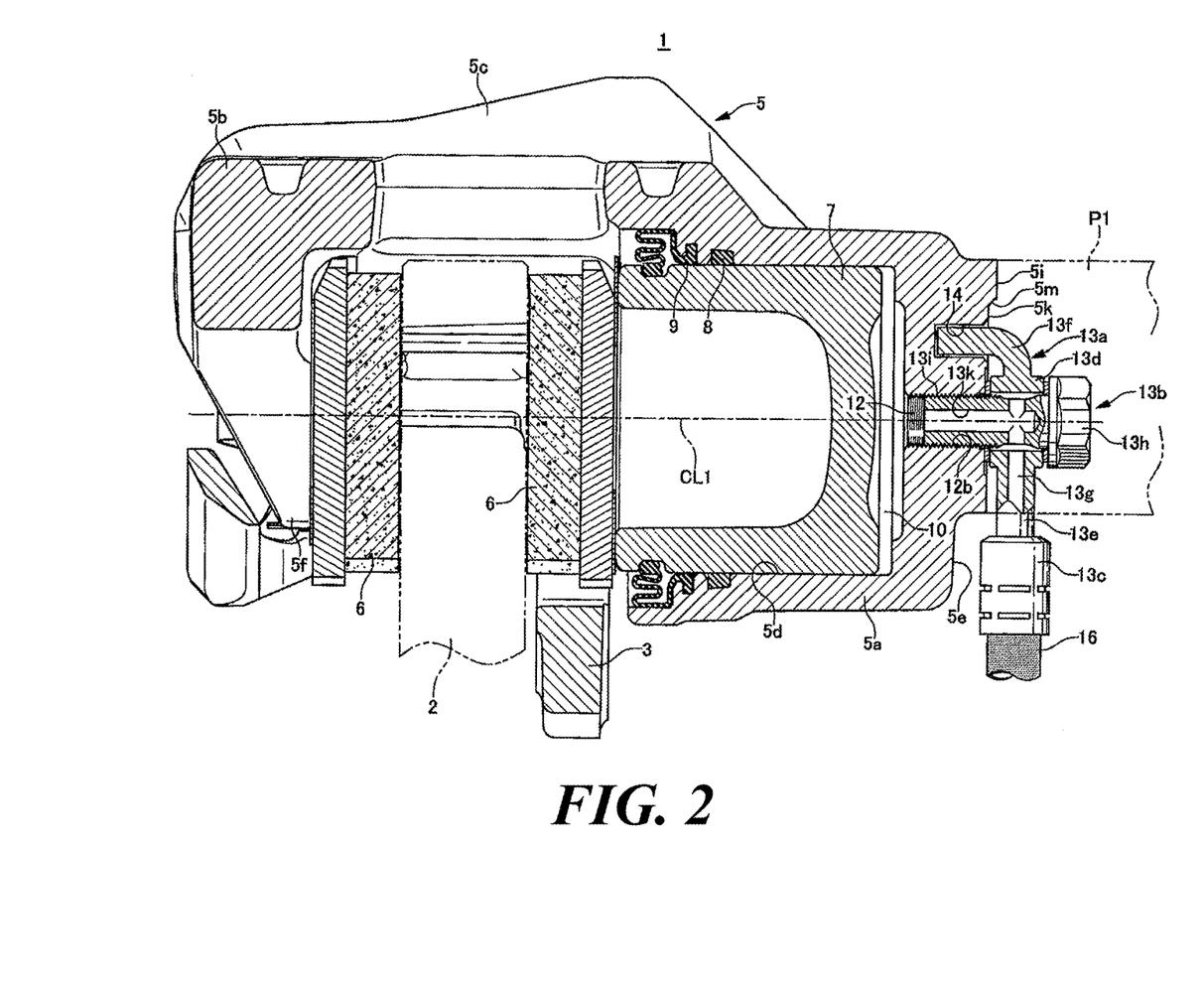
FIG. 2 is a sectional view taken along a line II-II in FIG. 1.

A vehicle disc brake 1 has a disc rotor 2 that rotates together with a wheel, a caliper bracket 3 that is fixed to a vehicle body at one side of the disc rotor 2, a caliper body 5 that is supported on the caliper bracket 3 so as to slide in the direction of an axis of the disc rotor 2 via a pair of slide pins 4, 4, and a pair of friction pads 6, 6 that are disposed opposite to each other across the disc rotor 2.

A pair of caliper support arms 3a, 3a are provided at a rotating disc entrance side and a rotating disc exit side of the caliper bracket 3, and the caliper support arms 3a, 3a are provided in such a way that the caliper support arms 3a, 3a straddle a radially outward side of the disc rotor 2 in parallel to the axis of the disc rotor 2 to hold a bridge portion of the caliper body 5 therebetween. A pin insertion hole is opened in each caliper support arm 3a so as to be opened to an acting portion side of the caliper body 5.

The caliper body 5 is formed of aluminum and is made up of an acting portion 5a and a reacting portion 5b that are disposed at both sides of the disc rotor 2 so as to face each other and a bridge portion 5c that straddles the radially outward side of the disc rotor 2 to connect the acting portion 5a and the reacting portion 5b together. A cylinder bore 5d is provided in the acting portion 5a so as to be opened to the side of the disc rotor 2. A piston 7 is inserted in the cylinder bore 5d via a piston seal 8 and a dust seal 9 so as to move therein. A hydraulic pressure chamber 10 is defined between a bottom wall 5e of the cylinder bore 5d and the piston 7, and a reaction force claw 5f is formed integrally on the reacting portion 5b.

Slide pin mounting arms 5g, 5g are provided at a rotating disc entrance side and a rotating disc exit side of the acting portion 5a so as to project therefrom. Slide pin insertion holes are formed individually at distal ends of the slide pin mounting arms 5g, 5g, and the slide pins 4, 4 that slide in pin insertion holes opened in the caliper support arms 3a, 3a are securely screwed into the slide pin insertion holes. A bleeder boss portion 5h is provided on a radially outer side of an outer circumferential wall of the cylinder bore 5d so as to project therefrom. A bleeder hole is formed in the bleeder boss portion 5h so as to communicate with the hydraulic pressure chamber 10, and a bleeder screw 11 is screwed into this bleeder hole.

Figure 3:
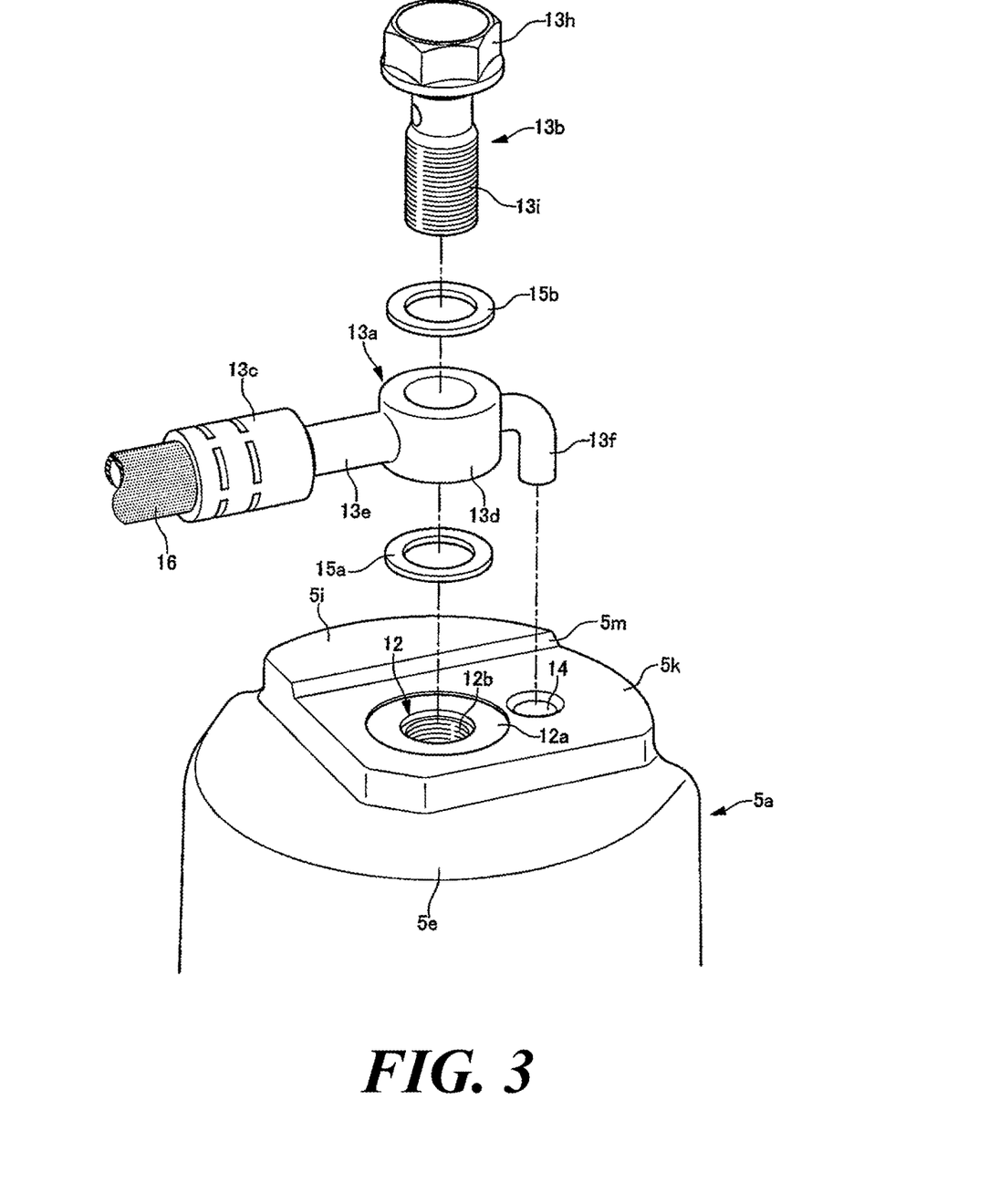
FIG. 3 is an exploded perspective view of a main part according to the embodiment.
Figure 4:
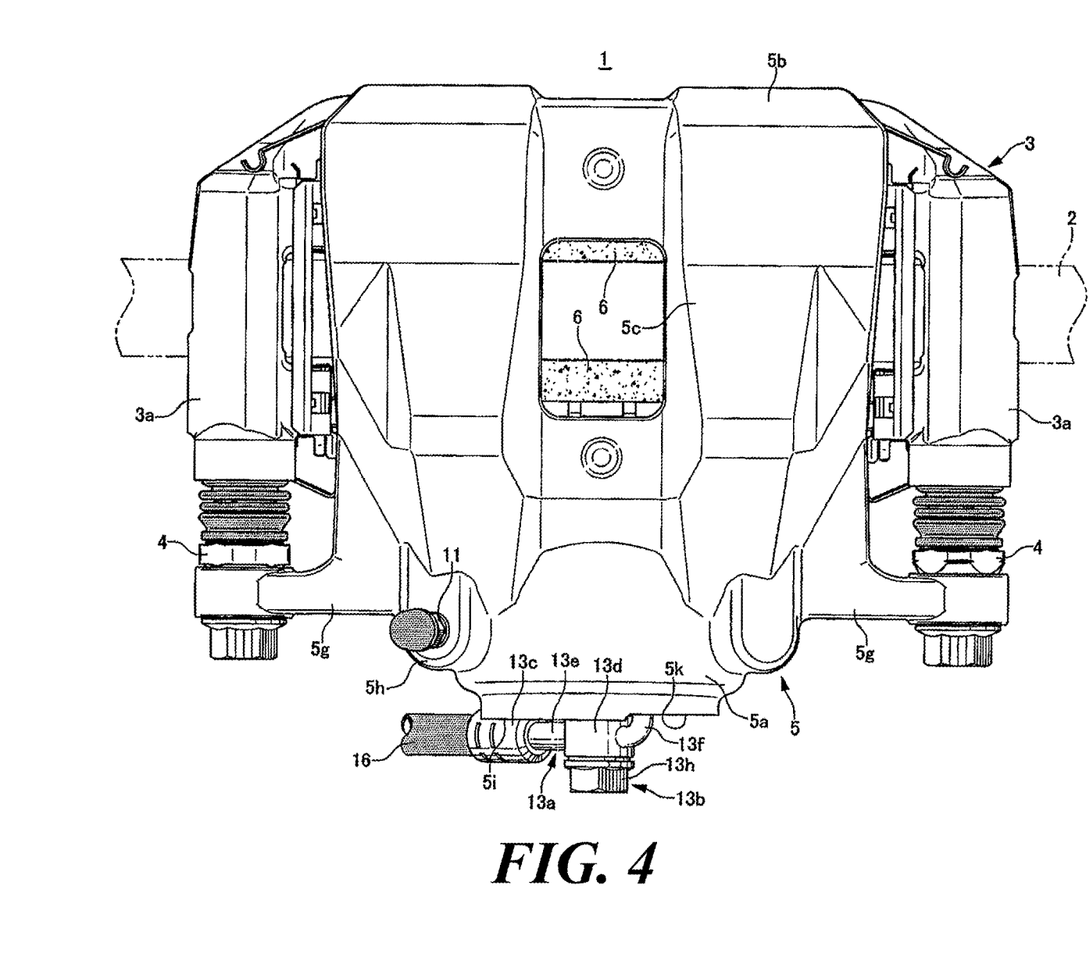
FIG. 4 is a plan view of the vehicle disc brake according to the embodiment.
Figure 5:
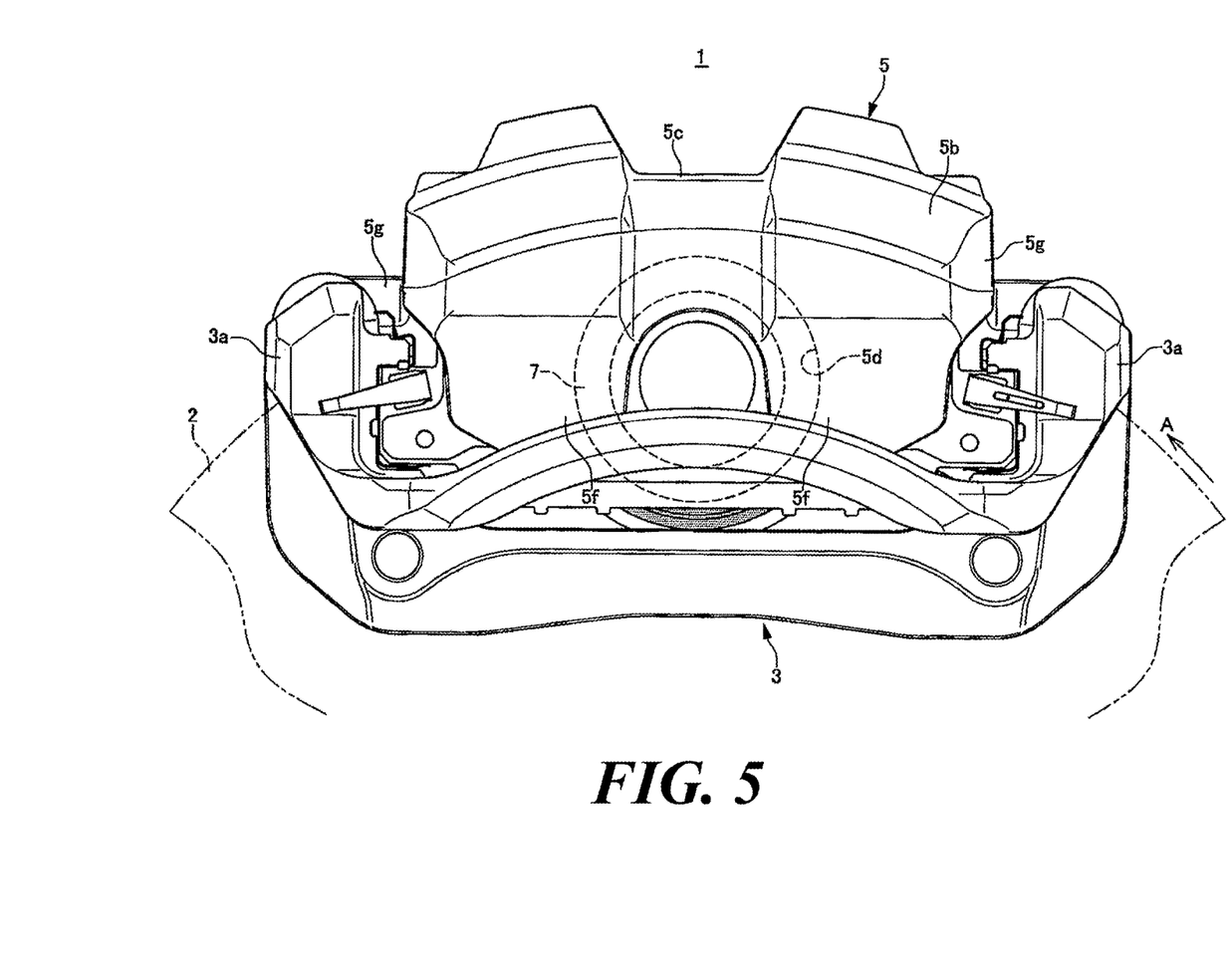
FIG. 5 is a rear view of the vehicle disc brake according to the embodiment.

A gate mark 5i is provided on the bottom wall 5e of the cylinder bore 5d so as to rise from the bottom wall 5e of the cylinder bore 5d. This gate mark 5i is formed as a result of cutting a portion that functioned as a gate P1 in casting the caliper body 5. A worked surface 5k is formed on the gate mark 5i, and this worked surface 5k is at right angles to an axis CL1 of the cylinder bore 5d. An uneven portion 5m is formed between the worked surface 5k and an external surface (a projecting surface) of the gate mark 5i that is not worked. This uneven portion 5m is formed at the same time as the worked surface 5k is formed by cutting the external surface of the gate mark 5i.

A union hole 12 and a locking hole 14 are opened in the worked surface 5k. The union hole 12 is opened on the axis CL1, and the locking hole 14 that locks a banjo 13a is opened in a position that lies further radially outwards towards an outer circumferential side of the cylinder bore than the union hole 12. The uneven portion 5m is formed parallel to a center line CL2 that connects a center of the union hole 12 and a center of the locking hole 14.

In this embodiment, the locking hole 14 is disposed at a rotating disc exit side of the bottom wall 5e, and the gate mark 5i is disposed at a rotating disc entrance side of the bottom wall 5e. A seat 12a where the banjo 13a is disposed via an O ring 15a is formed at an opening portion of the union hole 12.

The union hole 12 includes an internal thread portion 12b that is formed on an inner circumference thereof. Then, the banjo 13a that is secured to a distal end portion of a flexible hydraulic pressure piping 16 is attached to the internal thread portion 12b via a banjo bolt 13b.

The banjo 13a includes a fixed pipe 13c that is crimped to be fixed to an end portion of the hydraulic pressure piping 16, a ring member 13d that is fixed to the union hole 12 by the banjo bolt 13b via the O ring 15a and an O ring 15b, a small-diameter neck pipe 13e that connects the fixed pipe 13c and the ring member 13d together, and a locking projection 13f that projects from a position on a circumferential wall of the ring body 13d that lies opposite to the position where the neck pipe 13e is connected to the ring member 13d to be bent into an L-shape towards the bottom wall 5d of the cylinder bore 5d. A through hole 13g is formed in the banjo 13a so as to extend through the ring member 13d and the neck pipe 13e to communicate with the hydraulic pressure piping 16.

In the banjo bolt 13h, an external thread portion 13i is provided on an outer circumference of a distal end portion of a shank portion that projects from a hexagonal head portion 13b. A fluid passage hole 13k is formed in an interior of the shank portion so as to communicate with the hydraulic pressure chamber 10 and the through hole 13g of the ring member 13d, and the hydraulic pressure chamber 10 communicates with the hydraulic pressure piping 16 by way of the union hole 12, the fluid passage hole 13k of the banjo bolt 13b and the through hole 13g of the banjo 13a.

In assembling the banjo 13a, the banjo 13a is disposed parallel to the uneven portion 5m together with the end portion of the hydraulic pressure piping 16. The ring member 13d is disposed on the seat 12a via the O ring 15a, and the locking projection 13f is inserted into the locking hole 14. Thus, the banjo 13a is positioned properly and is locked to be free from rotation. Then, the banjo bolt 13b is inserted through the ring member 13d to be securely screwed into the union hole 12, whereby both the banjo 13a and the banjo bolt 13b are mounted in the union hole 12.

The caliper body 5 that is configured in the way described above is cast by disposing a gate P1 provided in a casting mold so as to be oriented upwards vertically and then pouring molten metal into the casting mold from the gate P1. After casting, the gate P1 is cut, and a gate mark 5i is formed into a flat plane. Following this, part of the gate mark 5i is cut to form a worked surface 5k and at the same time as this, an uneven portion 5m is formed between the worked surface 5k and an external surface of a non-worked portion of the gate mark 5i. In the caliper body 5, finishing work is done on a cylinder hole 5d, a union hole 12, a locking hole 14 and the like as required.

In this way, in this embodiment, the union hole 12 and the locking hole 14 are opened in the worked surface 5k provided at the non-worked gate mark 5i, and the banjo 13a is locked so as to be free from rotation by the locking projection 13f being inserted into the locking hole 14. Thus, the banjo 13a can be locked properly in an ensured fashion with a small number of working man-hours, thereby making it possible to realize a reduction in production cost.

Should the caliper body 5 be placed on the floor or the like with the bottom wall 5e of the cylinder bore 5d being oriented downwards, the union hole 12 and the locking hole 14 can be prevented from being brought into abutment with the surface of the floor by the gate mark 5i that projects from the worked surface 5k, whereby the union hole 12 and the locking hole 14 can be protected.

The uneven portion 5in that is formed between the worked surface 5k and the gate mark 5i is formed parallel to the center line CL2 that connects the center of the union hole 12 to the center of the locking hole 14, and therefore, the uneven portion 5m constitutes the indicator for the direction in which the banjo 13a is assembled to the union hole 12, whereby the banjo 13a can be assembled properly.

The locking hole 14 is disposed at the rotating disc exit side of the bottom wall 5e and the gate mark 5i is disposed at the rotating disc entrance side of the bottom wall 5e. Therefore, the space where to form the locking hole 14 in the bottom wall 5e can be ensured properly, and the locking hole 14, the union hole 12 and the gate mark 5i can be disposed properly in a well balanced fashion.

The vehicle disc brake of the invention is not limited to the embodiment. There will be no problem even in the event that the locking hole is formed in any position on the worked surface. The uneven portion that is formed between the worked surface and the gate mark does not have to be formed parallel to the center line that connects the center of the union hole to the center of the locking hole. The invention can also be applied to any type of vehicle disc brake that includes a union hole in a bottom wall of a cylinder bore. The base material of the caliper body is not limited to aluminum.

The invention claimed is:

1. A vehicle disc brake, comprising:
a caliper body including an acting portion having a cylinder bore into which a piston is inserted, and a union hole being formed in a bottom wall of the cylinder bore so as to communicate with a hydraulic pressure chamber defined between the cylinder bore and the piston; and
a banjo provided on a hydraulic pressure piping; and
a banjo bolt which attaches the banjo on the union hole,
wherein a locking projection is formed on the banjo so as to project towards the bottom wall of the cylinder bore,
wherein a first surface is formed on the bottom wall of the cylinder bore,
wherein a second surface is formed at right angles to an axis of the cylinder bore such that the first surface projects further than the second surface in a direction opposite to a bottom portion of the cylinder bore,
wherein the union hole and a locking hole are opened in the second surface, the union hole and the locking hole are aligned such that a center line connects a center of the union hole and a center of the locking hole, the center line crosses between a rotating disc entrance side and a rotating disc exit side which are positioned on opposing sides of a vertical line that passes through a center of the cylinder bore and crosses the center line, and the locking hole being formed so as to receive the locking projection of the banjo to thereby lock the banjo,
wherein an uneven portion is provided between the second surface and the first surface, and
wherein the locking hole is formed only at the rotating disc entrance side or the rotating disc exit side of the bottom wall of the cylinder bore, and the first surface is formed at the other of the rotating disc entrance side and the rotating disc exit side of the bottom wall of the cylinder bore, the rotating disc entrance side and the rotating disc exit side being defined and based on a rotational direction of a disc rotor with respect to the caliper body in a state where a vehicle is traveling forwards.

2. The vehicle disc brake of claim 1,
wherein the uneven portion is formed parallel to the center line that connects the center of the union hole and the center of the locking hole.

3. The vehicle disc brake of claim 1,
wherein the first surface is an external surface.

4. The vehicle disc brake of claim 1,
wherein a base material of the caliper body is aluminum or aluminum alloy.

5. The vehicle disc brake of claim 1, wherein the rotating disc entrance side and the rotating disc exit side are defined with respect to the vertical line that passes through the center of the cylinder bore and based on the rotational direction of the disc rotor with respect to the caliper body in the state where the vehicle is traveling forwards.

6. The vehicle disc brake of claim 1,
wherein the locking hole is disposed at the rotating disc exit side of the bottom wall, and the first surface is disposed at the rotating disc entrance side of the bottom wall.

7. The vehicle disc brake of claim 1,
wherein the first surface is disposed at the rotating disc exit side of the bottom wall, and the locking hole is disposed at the rotating disc entrance side of the bottom wall.

8. The vehicle disc brake of claim 1, further comprising a seat where the banjo is disposed at an opening portion of the union hole.

9. The vehicle disc brake of claim 1, wherein
the first surface is formed mainly on the other of the rotating disc exit side or rotating disc entrance side with overlap onto the rotating disc entrance side or rotating disc exit side.

10. The vehicle disc brake of claim 1,
wherein the first surface is provided on the bottom wall of the cylinder bore so as to rise from the bottom wall of the cylinder bore.

11. The vehicle disc brake of claim 10,
wherein the uneven portion is a transition between the first surface at a first height and the second surface at a second height.

12. The vehicle disc brake of claim 11,
wherein the locking hole is opened in a position that lies further radially outwards towards an outer circumferential side of the cylinder bore than the union hole.

13. The vehicle disc brake of claim 12,
wherein the uneven portion is formed parallel to the center line that connects the center of the union hole and the center of the locking hole.

14. The vehicle disc brake of claim 1,
wherein the union hole includes an internal thread portion that is formed on an inner circumference thereof.

15. The vehicle disc brake of claim 14,
wherein the banjo secured to a distal end portion of a flexible hydraulic pressure piping is attached to the internal thread portion via the banjo bolt.

16. The vehicle disc brake of claim 14,
wherein the union hole and the locking hole are opened in the second surface, and the banjo is locked so as to be free from rotation by the locking projection being inserted into the locking hole.

17. The vehicle disc brake of claim 16,
wherein the uneven portion that is formed between the second surface and the first surface is formed parallel to the center line that connects the center of the union hole to the center of the locking hole.

18. The vehicle disc brake of claim 17,
wherein the uneven portion is structured as an indicator for a direction in which the banjo is assembled to the union hole.

19. A vehicle disc brake, comprising:
a caliper body including an acting portion having a cylinder bore into which a piston is inserted, and a union hole being formed in a bottom wall of the cylinder bore so as to communicate with a hydraulic pressure chamber defined between the cylinder bore and the piston; and
a banjo provided on a hydraulic pressure piping; and
a banjo bolt which attaches the banjo on the union hole,
wherein a locking projection is formed on the banjo so as to project towards the bottom wall of the cylinder bore,
wherein a first surface is formed on the bottom wall of the cylinder bore,
wherein a second surface is formed at right angles to an axis of the cylinder bore such that the first surface projects further than the second surface in a direction opposite to a bottom portion of the cylinder bore,
wherein the union hole and a locking hole are opened in the second surface, the locking hole being formed so as to receive the locking projection of the banjo to thereby lock the banjo,
wherein an uneven portion is provided between the second surface and the first surface,
wherein the locking hole is formed at either of a rotating disc entrance side and a rotating disc exit side of the bottom wall of the cylinder bore, and the first surface is formed at the other of the rotating disc entrance side and the rotating disc exit side of the bottom wall of the cylinder bore, the rotating disc entrance side and the rotating disc exit side being defined and based on a rotational direction of a disc rotor with respect to the caliper body in a state where a vehicle is traveling forwards,
wherein the first surface is provided on the bottom wall of the cylinder bore so as to rise from the bottom wall of the cylinder bore,
wherein the uneven portion is a transition between the first surface at a first height and the second surface at a second height,
wherein the locking hole is opened in a position that lies further radially outwards towards an outer circumferential side of the cylinder bore than the union hole,
wherein the uneven portion is formed parallel to a center line that connects a center of the union hole and a center of the locking hole, and
wherein the locking hole is disposed at a rotating disc exit side of the bottom wall, and the first surface is disposed at a rotating disc entrance side of the bottom wall.

20. The vehicle disc brake of claim 19, further comprising a seat where the banjo is disposed at an opening portion of the union hole.

* * * * *